(12) United States Patent
Sato (10) Patent No.: US 12,086,959 B2
(45) Date of Patent: Sep. 10, 2024

(54) IMAGE PROCESSING APPARATUS CAPABLE OF ENSURING WIDE DYNAMIC RANGE WHILE REDUCING STRANGENESS GENERATED DUE TO MOVING BODY, METHOD OF CONTROLLING SAME, AND IMAGE CAPTURING APPARATUS

(71) Applicant: CANON KABUSHIKI KAISHA, Tokyo (JP)

(72) Inventor: Kazuki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/047,888

(22) Filed: Oct. 19, 2022

(65) Prior Publication Data

US 2023/0131477 A1    Apr. 27, 2023

(30) Foreign Application Priority Data

Oct. 22, 2021    (JP) .................................. 2021-173014

(51) Int. Cl.
| | |
|---|---|
| *G06T 5/50* | (2006.01) |
| *G06T 7/20* | (2017.01) |
| *G06V 10/60* | (2022.01) |
| *G06V 10/74* | (2022.01) |

(52) U.S. Cl.
CPC .................. *G06T 5/50* (2013.01); *G06T 7/20* (2013.01); *G06V 10/60* (2022.01); *G06V 10/761* (2022.01); *G06T 2207/10024* (2013.01); *G06T 2207/10144* (2013.01); *G06T 2207/20221* (2013.01)

(58) Field of Classification Search
CPC ........ C07D 215/56; G06T 2207/10016; G06T 2207/10024; G06T 2207/10144; G06T 2207/20208; G06T 2207/20221; G06T 5/50; G06T 7/20; G06V 10/12; G06V 10/60; G06V 10/761; G06V 10/993; G06V 40/103

See application file for complete search history.

(56) References Cited

U.S. PATENT DOCUMENTS

| | | | | |
|---|---|---|---|---|
| 2015/0341537 | A1* | 11/2015 | Peng ...................... | H04N 23/71 348/234 |
| 2016/0227091 | A1* | 8/2016 | Miura .................. | H04N 25/531 |
| 2019/0182458 | A1* | 6/2019 | Kawano .................... | H04N 9/77 |
| 2020/0051256 | A1* | 2/2020 | Wang ........................ | G06T 7/20 |

FOREIGN PATENT DOCUMENTS

| | | |
|---|---|---|
| JP | 2013-240031 A | 11/2013 |
| JP | 2018-056940 A | 4/2018 |

\* cited by examiner

*Primary Examiner* — Ming Wu
(74) *Attorney, Agent, or Firm* — Canon U.S.A., Inc., IP Division

(57) ABSTRACT

An image processing apparatus that is capable of ensuring a wide dynamic range while reducing strangeness generated due to a moving body. The image processing apparatus acquires a plurality of images amplified with different gains, respectively, for each of exposure operations with different exposure amounts, determines whether or not there is a moving body having moved between images acquired for each of exposure operations with different exposure amounts, and selects images to be used for image combination out of the plurality of acquired images, based on a result of the determination.

11 Claims, 11 Drawing Sheets

IMAGE PROCESSING APPARATUS CAPABLE OF ENSURING WIDE DYNAMIC RANGE WHILE REDUCING STRANGENESS GENERATED DUE TO MOVING BODY, METHOD OF CONTROLLING SAME, AND IMAGE CAPTURING APPARATUS

BACKGROUND

Technical Field

One disclosed aspect of the embodiments relates to an image processing apparatus that is capable of ensuring a wide dynamic range while reducing strangeness generated due to a moving body, a method of controlling the same, and an image capturing apparatus.

Description of the Related Art

Conventionally, in an image processing apparatus, such as an image capturing apparatus, there is known a technique for realizing a wide dynamic range by photographing a plurality of images including an image having less whiteout and an image having less blackout by changing exposure conditions, and then combining these images. This technique is called the high dynamic range (HDR) combination. This HDR combination is not suitable for photographing a moving object, because deviation in photographing timing occurs between the plurality of images, causing generation of a combined image having strangeness due to different luminance depending on the position of the moving object.

On the other hand, there is known an image capturing device (Dual Gain Output (DGO) sensor) that has two column circuits for output signals from unit pixels, with a gain separately provided for an amplifier included in each column circuit, and is capable of outputting images formed by amplifying the output signals with different gains. This image capturing device can output a plurality of images to which different gains are applied by one exposure operation (such as a high gain image and a low gain image). Comparison between combination of two images obtained by DGO and combination of two images obtained by time-division exposure shows that DGO is advantageous in that it does not require position matching and is capable of photographing a moving body well. Therefore, DGO has good compatibility with HDR combination for obtaining an image having an increased dynamic range.

Incidentally, the image capturing device has a floating diffusion (FD) portion that plays a roll of a capacitor that accumulates electric charges. In the FD portion, the magnitude of the charge capacity that can accumulate electric charges varies with the setting therefor. If the capacity is increased, a larger amount of light can be processed, and hence the FD portion having an increased capacity is used for a low sensitivity. However, an increase in capacity has a bad effect that noise is increased.

To generate a natural image, Japanese Laid-Open Patent Publication (Kokai) No. 2013-240031 discloses a technique of replacing an area corresponding to a moving body in a combined image of a plurality of images captured by executing time-division exposure while changing the exposure, with an image formed by adding weighted images formed from the plurality of images. However, in this technique, the replaced moving body area is combined as an afterimage, and hence it is impossible to sufficiently eliminate the strangeness.

Japanese Laid-Open Patent Publication (Kokai) No. 2018-56940 discloses a technique for generating a HDR image having a wide dynamic range by combining a plurality of images obtained by amplifying image signals captured with different exposure time periods with different gains. According to this technique, strangeness of a moving body, generated due to deviations in photographing timing, is not generated.

However, to obtain a dynamic range equivalent to the dynamic range obtained by time-division exposure, it is necessary to use a capacitor increased in the charge capacity. If the charge capacity of the capacitor is increased, noise is increased, compared with a HDR image obtained by photographing a plurality of images by executing time-division exposure and combining the images. Therefore, in realizing the wide dynamic range, there is a problem that it is not easy to reduce strangeness generated due to a moving body.

SUMMARY

One disclosed aspect of the embodiments provides an image processing apparatus that is capable of ensuring a wide dynamic range while reducing strangeness generated due to a moving body, a method of controlling the same, and an image capturing apparatus. The term "strangeness" here refers to a situation where the resulting image or images exhibit unnatural or abnormal characteristics. This unnatural or abnormal characteristics may be due to artifacts, distortions, occlusions, or any result that may look strange to an observer.

In a first aspect of the disclosure, there is provided an image processing apparatus, including at least one processor, and a memory coupled to the at least one processor, the memory having instructions that, when executed by the processor, perform the operations as an acquisition unit, a determination unit, and a selection unit. The acquisition unit is configured to acquire a plurality of images amplified with different gains, respectively, for each of exposure operations with different exposure amounts. The determination unit is configured to determine whether or not there is a moving body having moved between images acquired for each of exposure operations with different exposure amounts, and a selection unit configured to select images to be used for image combination out of the plurality of acquired images, based on a result of determination performed by the determination unit.

In a second aspect of the disclosure, there is provided an image capturing apparatus, including the image processing apparatus described above, and a sensor that outputs images amplified with different gains, respectively, by one exposure operation.

In a third aspect of the disclosure, there is provided a method of controlling an image processing apparatus, including acquiring a plurality of images amplified with different gains, respectively, for each of exposure operations with different exposure amounts, determining whether or not there is a moving body having moved between images acquired for each of exposure operations with different exposure amounts, and selecting images to be used for image combination out of the plurality of acquired images, based on a result of the determination.

According to the disclosure, it is possible to ensure a wide dynamic range while reducing strangeness generated due to a moving body.

Further features of the disclosure will become apparent from the following description of exemplary embodiments (with reference to the attached drawings).

DESCRIPTION OF THE EMBODIMENTS

The disclosure will now be described in detail below with reference to the accompanying drawings showing embodiments thereof. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
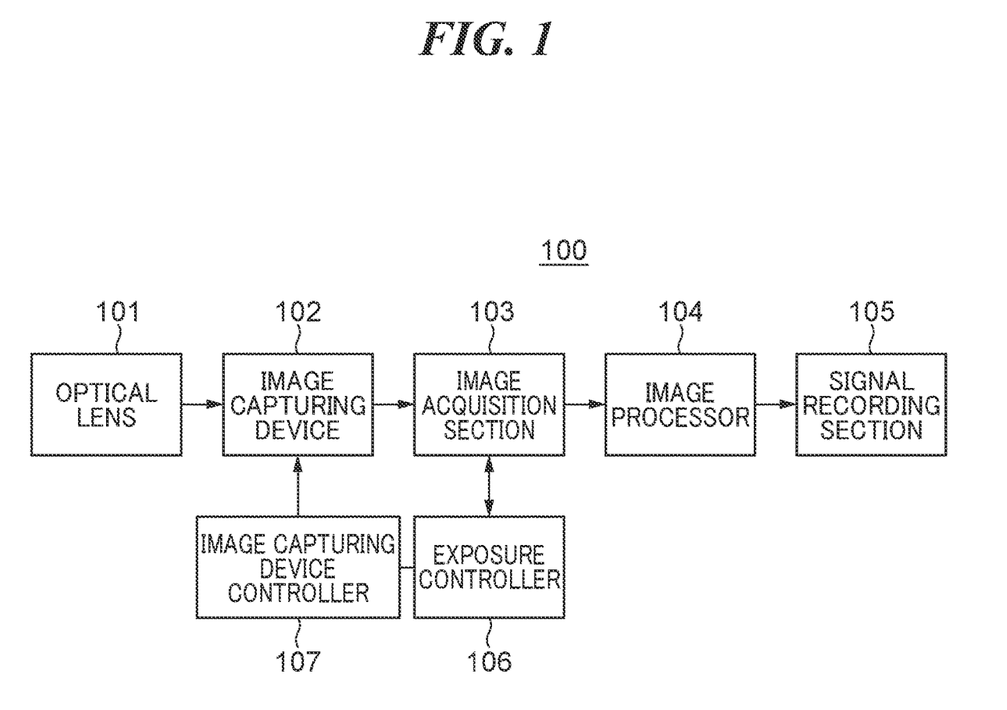
FIG. 1 is a block diagram of an image processing apparatus.

FIG. 1 is a block diagram of an image processing apparatus according to an embodiment. This image processing apparatus is an image capturing apparatus 100, such as a digital single-lens reflex camera, a digital still camera, or a digital video camera, by way of example.

An optical lens 101 is an optical element that receives light from an object and causes the light to form an image on an image capturing device 102. The image capturing device 102 receives incident light from the optical lens 101, converts the light to electrical signals, and outputs the electrical signals. As the image capturing device 102, a charge-coupled device (CCD) image sensor, a complementary metal-oxide-semiconductor (CMOS) image sensor, or the like is employed.

In general, the image capturing devices include one that directly outputs analog signals and one that performs analog-to-digital (AD) conversion processing therein and outputs the signals as digital data using e.g. low voltage differential signaling (LVDS). The latter type is employed for the image capturing device 102. Note that in a case where an image capturing device that does not perform AD conversion therein is employed, an analog front end that performs analog-to-digital conversion is also included in the image capturing device 102.

An image acquisition section 103 captures video signals output from the image capturing device 102 and includes blocks that perform respective processing operations on the video signals. The image acquisition section 103 performs processing for eliminating fixed pattern noise of the image capturing device 102, black level clamping, and so forth. The image acquisition section 103 also plays the role of separating the video signals into image signals used for recording and evaluation signals for controlling the image capturing device 102.

An image processor 104 performs various image processing operations, such as white balance adjustment, color interpolation, filtering, and combination processing, on the video signals acquired from the image acquisition section 103. Further, the image processor 104 performs compression processing on the video signals acquired from the image acquisition section 103 according to the standard, such as Joint Photographic Experts Group (JPEG). A signal recording section 105 records the video signals received from the image processor 104 in a storage device or storage medium (neither of which is shown). An exposure controller 106 calculates an optimum exposure amount from the video signals received from the image acquisition section 103, determines an operation of an image capturing device controller 107, and notifies the image capturing device controller 107 of the determined operation of control.

The image capturing apparatus 100 includes a central processing unit (CPU), a read-only memory (ROM), and a random-access memory (RAM) (none of which are shown). The respective functions of the image acquisition section 103, the image processor 104, the signal recording section 105, the exposure controller 106, and the image capturing device controller 107 are realized by the cooperative operation of the CPU, the ROM, the RAM, and so forth.

Figure 2:
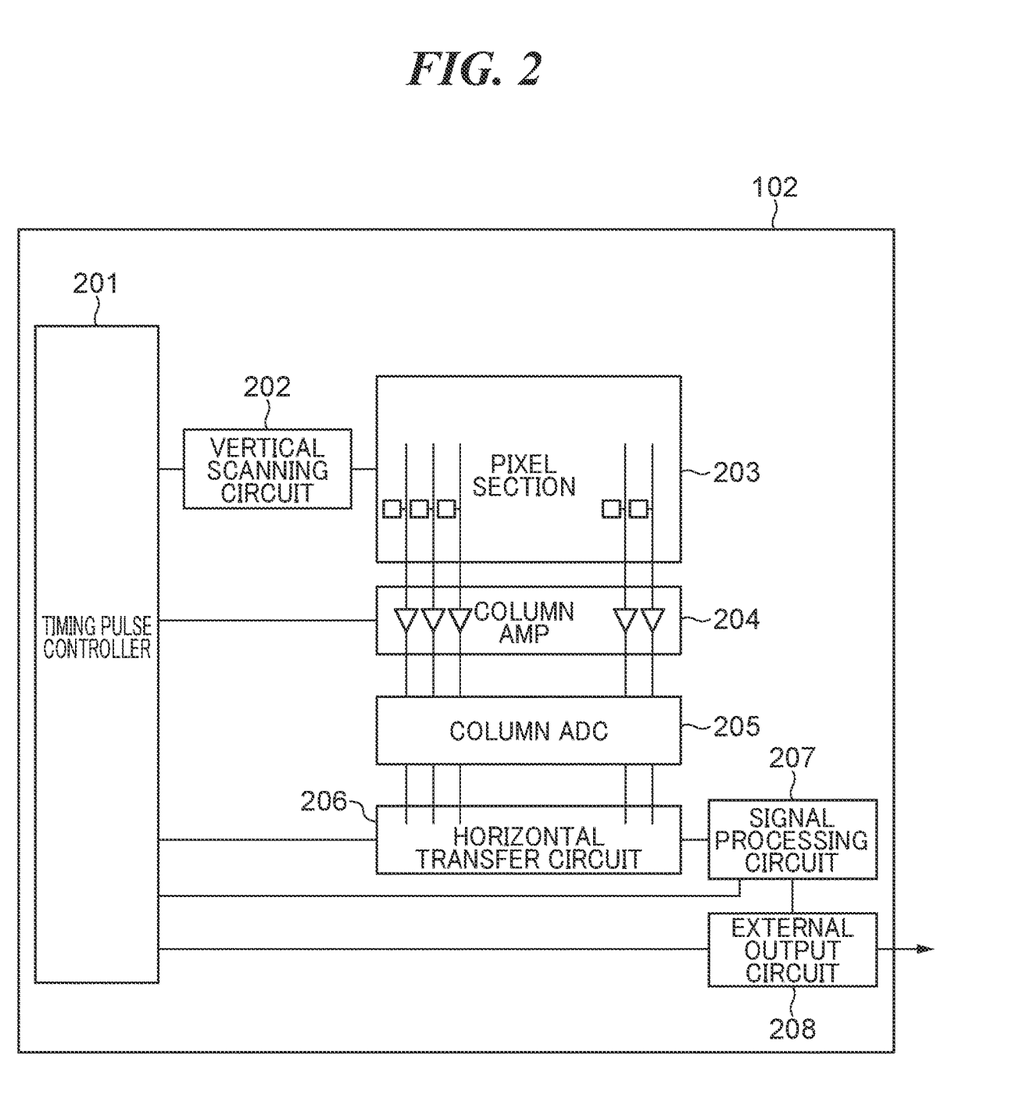
FIG. 2 is a block diagram of an image capturing device.

FIG. 2 is a block diagram of the image capturing device 102. A timing pulse controller 201 controls the operation of the image capturing device 102 by supplying an operation clock (CLK) to each block of the image capturing device 102 and supplying a timing signal to each block. A vertical scanning circuit 202 performs timing control for sequentially reading pixel signal voltages, per frame, which are generated by a pixel section 203 in which pixels are two-dimensionally arranged. In general, the video signals are sequentially read out on a row-by-row basis, from an upper row to a lower row, per frame.

The pixel section 203 is a photoelectric conversion element that performs photoelectric conversion of incident light according to incident light amounts associated with respective pixels and outputs the acquired incident light amounts as voltages. More specifically, the pixel section 203 converts acquired light associated with each pixel to an electric charge and accumulates the electric charge in a floating diffusion (FD) portion, not shown, associated with the pixel.

The magnitude of the capacity of the FD portion is variable, and for example, the capacity can be changed between "large" and "small". It is possible to improve the S/N ratio by changing the capacity according to an International Organization for Standardization (ISO) sensitivity. Basically, the capacity is set to be large when the ISO sensitivity is low and set to be small when the ISO sensitivity is high.

Note that when two images amplified with respective different gains, referred to hereinafter, are output, the capacity for charge accumulation is the same with respect to these two gains. Note that the magnitude of the capacity is not limited to the two levels of large and small but can be set to three or more levels.

A column amplifier (AMP) circuit 204 is used to electrically amplify signals read from the pixel section 203. The signal level of each pixel signal is amplified by the column AMP 204, whereby the pixel signal level is made higher than the level of noise output from a column ADC 205 at a latter stage, whereby the S/N ratio is equivalently improved.

Further, the timing pulse controller 201 can change the gain of the column AMP 204. The image capturing device 102 has two input memories used for generating a HDR image, in the column AMP 204, and can output two types of gains by changing the gain of the column AMP 204 (column AMP gain). With provision of the two input memories, the column AMP 204 can amplify a signal read from the FD portion at one time with two gains to thereby output two types of signals. Therefore, although the amount of data increases, it is possible to obtain two images which are coincident in time and different in gain. As described above, the image capturing device 102 is an example of a sensor that outputs a plurality of images amplified with different gains, respectively, by one exposure operation. Note that although in the present embodiment, the number of different gains is set to two, and the two images are output, the number of gains, i.e. the number of images simultaneously output by one exposure operation is not limited to two.

The column ADC 205 converts signals output from the column AMP 204 from analog to digital. The digitalized signals are sequentially read by a horizontal transfer circuit 206. The output of the horizontal transfer circuit 206 is input to a signal processing circuit 207. The signal processing circuit 207 is a circuit that performs signal processing digitally. The signal processing circuit 207 is capable of easily performing gain calculation by performing shift calculation and multiplication. Further, the signal processing circuit 207 may perform a digital black level clamping operation, by providing the pixel section 203 with a pixel area that is intentionally shielded from light.

The output of the signal processing circuit 207 is output to an external output circuit 208. The external output circuit 208 has a serializer function, and converts the multi-bit input parallel signal from the signal processing circuit 207 into a serial signal. Further, the external output circuit 208 converts this serial signal into, for example, an LVDS signal and performs image information communication with an external device.

Next, the operation of the image capturing device 102 performed when generating a HDR image will be described. As described above, to generate the HDR image, the image capturing device 102 can output signals by changing the column AMP gain.

Figure 3:
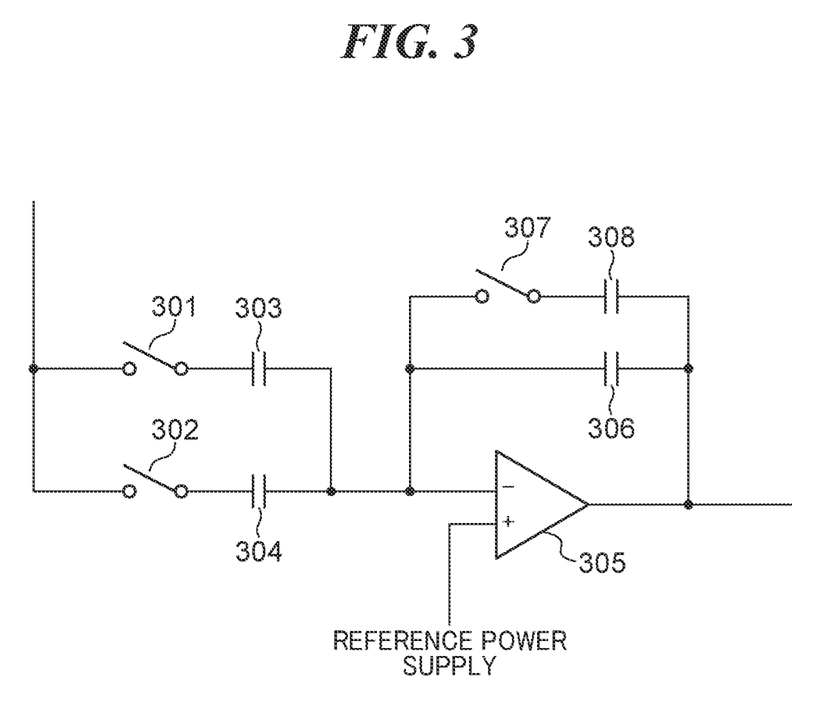
FIG. 3 is a diagram showing one column extracted from a column AMP section.

FIG. 3 is a diagram showing one column extracted from the column AMP 204. Each of columns of the column AMP 204 has switch elements 301, 302, and 307, input capacitors 303 and 304, an operational amplifier 305, and feedback capacitors 306 and 308.

To the operational amplifier 305, the input capacitors and the feedback capacitors are connected. More specifically, a reference voltage is applied to a plus (+) terminal of the operational amplifier 305, and the feedback capacitors 306 and 308 are connected to a minus (−) terminal of the same. To the input capacitors 303 and 304, a signal read from the pixel section 203 is input via the switch elements 301 and 302. Connection to the feedback capacitor 308 is controlled by the switch element 307.

Since the column AMP 204 uses the input capacitors, the amplification factor (gain) of the amplifier is defined by the capacitance of an input capacitor/the capacitance of a feedback capacitor. Since the column AMP 204 has the two input capacitors, the column AMP 204 can output two images formed by amplifying using different gains, respectively. For example, by connecting the switch element 301 and disconnecting the switch elements 302 and 307, it is possible to amplify a signal with a gain defined by the input capacitor 303 and the feedback capacitor 306 and output the obtained signal to the column ADC 205. Further, by disconnecting the switch element 301 and connecting the switch elements 302 and 307, it is possible to amplify a signal with a gain defined by the input capacitor 304 and the feedback capacitors 306 and 308 and output the obtained signal to the column ADC 205.

Figure 4:
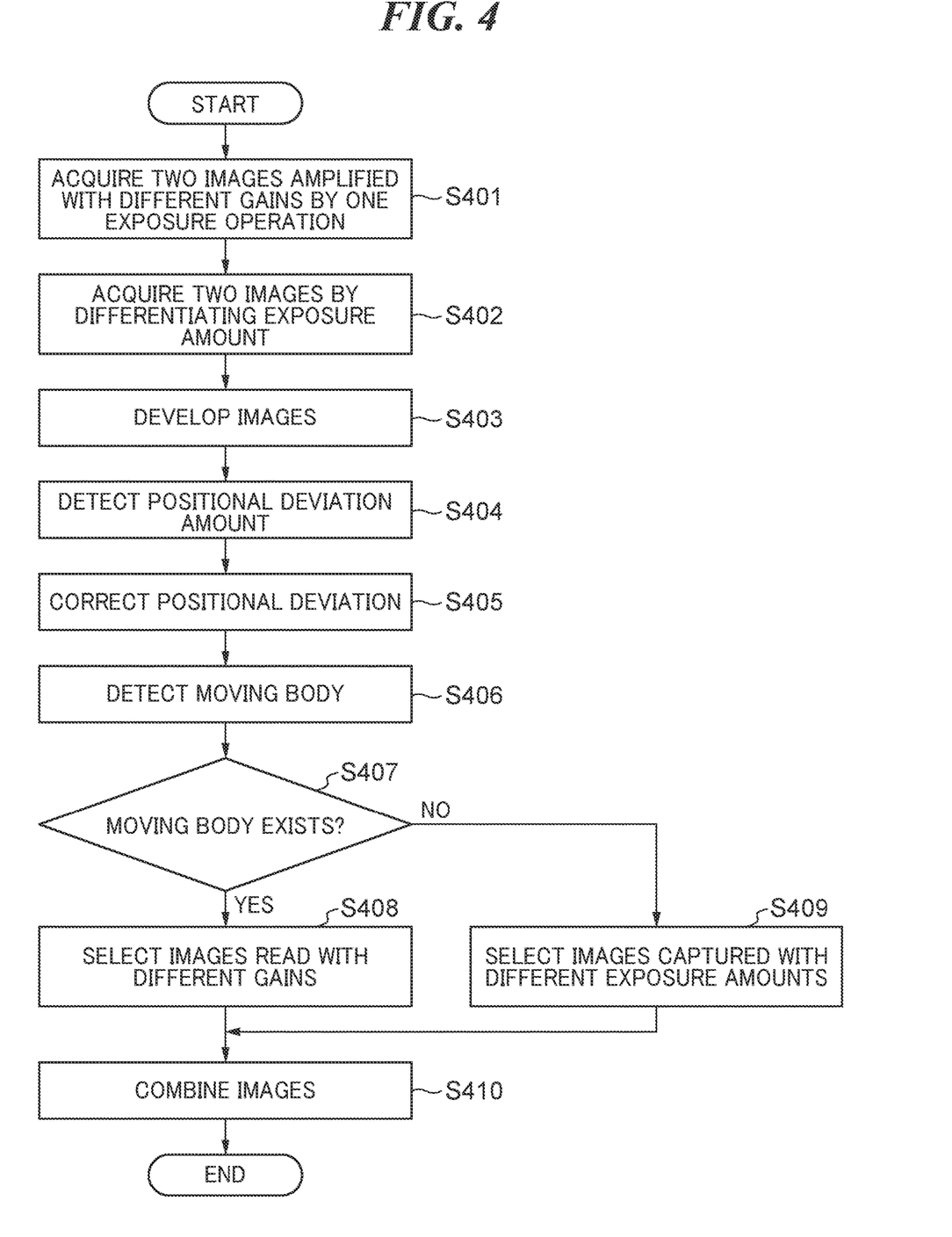
FIG. 4 is a flowchart of an image combining process.

FIG. 4 is a flowchart of an image combining process. This process is a process for selecting images for HDR combination and performing HDR combination of the images. This process is realized by the above-mentioned CPU included in the image capturing apparatus 100, which loads a program stored in the ROM into the RAM, for execution of the program. This process is started when the start of HDR combination is instructed. The start of HDR combination is instructed by a user who operates an operation section, not shown. The term "combination" here refers to a process in which images at various exposures are selected according to some specified condition and the selected images are merged into a sequence of images.

Figure 5:
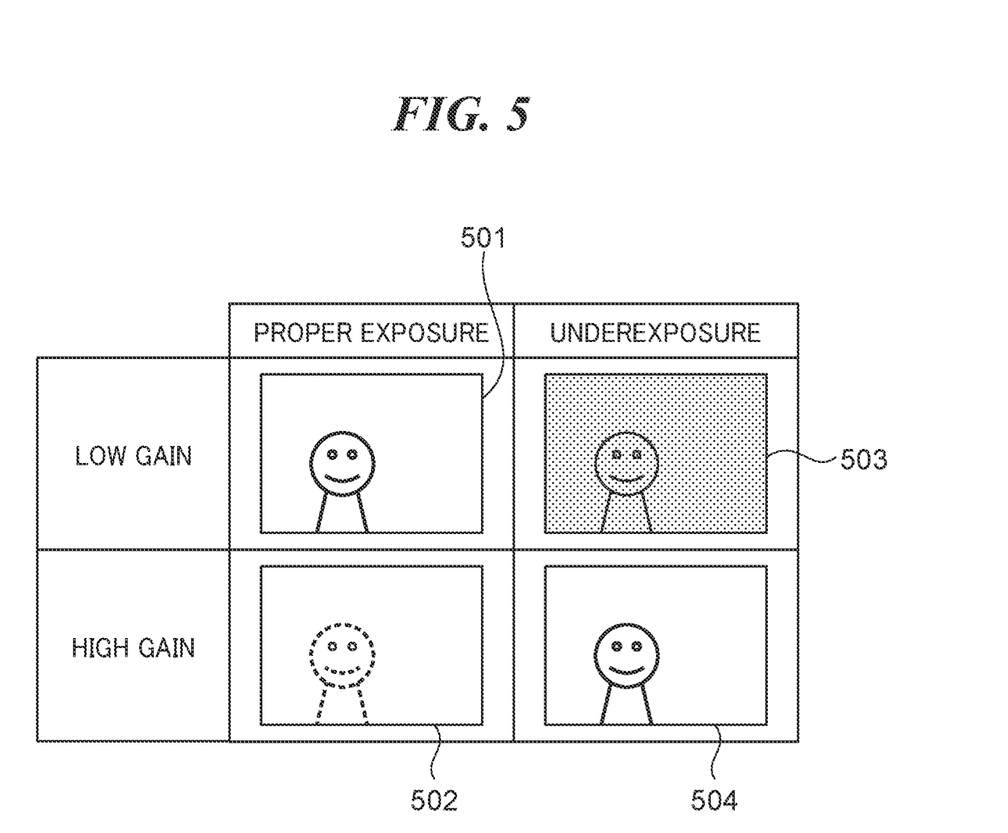
FIG. 5 is a diagram showing an example of a plurality of images amplified with different gains, for each of exposure operations with respective different exposure amounts.

FIG. 5 is a diagram showing an example of a plurality of images amplified with gains different from each other, for each of exposure operations with different exposure amounts (exposure time periods). An image 501 (first image) is a proper image captured with an exposure amount (first exposure amount) calculated by the exposure controller 106 so as to make the exposure proper. An image 502 (second image) is an overexposure image read with a gain (second gain) higher than a gain (first gain) applied when the image 501 is read (amplified). The exposure amount is the same for the image 501 and the image 502. Note that the number of times of image capturing with different exposure amounts may be three times or more.

An image 503 (third image) is an underexposure image captured with an exposure amount (second exposure amount) less than the exposure amount (shorter in exposure time period) set when the image 501 has been acquired. An image 504 (fourth image) is an image read with a gain higher than a gain applied to the image 503 so as to make the luminance level equivalent to that of the image 501. The gains applied when reading the images 503 and 504, respectively, are the same as the gains applied when reading the images 501 and 502, and are the first and second gains, respectively. As a result, the luminance level of the image 504 becomes equivalent to that of the image 501 which is a proper image.

In a step S401, the image capturing device controller 107 performs image capturing by one exposure operation with the first exposure amount calculated by the exposure controller 106. With this, the image acquisition section 103 as an acquisition unit acquires the images 501 and 502 (see FIG. 5) which are two images amplified with the different gains, from the image capturing device 102.

In a step S402, the image capturing device controller 107 performs image capturing by one exposure operation with the second exposure amount less than the exposure amount used by the exposure controller 106 in the step S401. With this, the image acquisition section 103 as the acquisition unit acquires the images 503 and 504 (see FIG. 5) which are two images amplified with different gains, from the image capturing device 102.

In a step S403, the image processor 104 develops the images acquired in the steps S401 and S402. In a step S404, the image processor 104 calculates an amount of positional deviation between the images which have been captured and developed by differentiating the exposure amount. An example of the method of calculating the positional deviation amount will be described below.

First, the image processor 104 sets a plurality of blocks in a reference image (e.g., the image 501). It is preferable that the image processor 104 sets the blocks such that the blocks have the same size. Next, the image processor 104 sets search ranges in a target image (such as the image 503) of which the positional deviation is to be corrected, in the same positions as those in the blocks of the reference image, respectively.

Next, the image processor 104 calculates a corresponding point at which the sum of absolute differences (SAD) in luminance value from the blocks of the reference image becomes minimum, in each search range of the target image.

The image processor 104 calculates the positional deviation as a motion vector based on the center of each block of the reference image and the above-described corresponding point. The image processor 104 may use not only the SAD, but also the sum of squared difference (SSD) or the like, for the calculation of the corresponding point. Alternatively, the image processor 104 may use normalized cross correlation (NCC) or the like.

After calculating motion vectors in all of the blocks, the image processor 104 calculates an affine coefficient, which is a matrix used for affine transformation in which linear conversion and parallel motion are combined, by the following equation (1).

$$I' = \begin{pmatrix} x' \\ y' \\ 1 \end{pmatrix} = AI = \begin{pmatrix} a & b & c \\ d & e & f \\ 0 & 0 & 1 \end{pmatrix} \begin{pmatrix} x \\ y \\ 1 \end{pmatrix} \quad (1)$$

In the equation (1), (x, y) represents the coordinates of an image before correction, and (x', y') represents the coordinates of the image after correction. The matrix A represents the affine coefficient and is calculated using the motion vectors calculated from the respective blocks. Note that a, b, d, and e in the matrix A each represent a rotational motion parameter, c represents an amount of horizontal motion, and f represents an amount of vertical motion.

In a step S405, the image processor 104 performs affine transformation based on the affine coefficient calculated in the step S404 and corrects the image position of the target image by the positional deviation amount.

In a step S406, the image processor 104 performs moving body detection between the reference image and the image for comparison, of which the position has been corrected. In doing this, an image acquired with the first exposure amount and the first gain may be set as the reference image, and an image obtained by correcting the position of an image acquired with the second exposure amount and the second gain may be set as the image for comparison, by way of example.

Figure 6A:
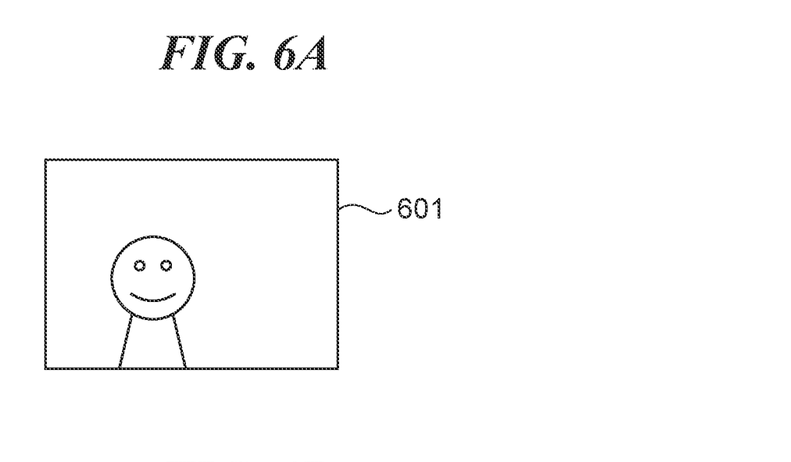
FIGS. 6A to 6E are diagrams showing images and detection results in moving body detection.
Figure 6B:
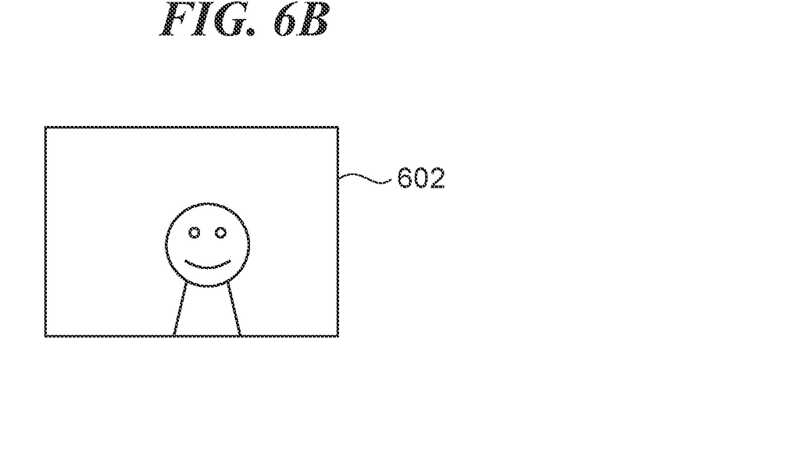
Figure 6C:
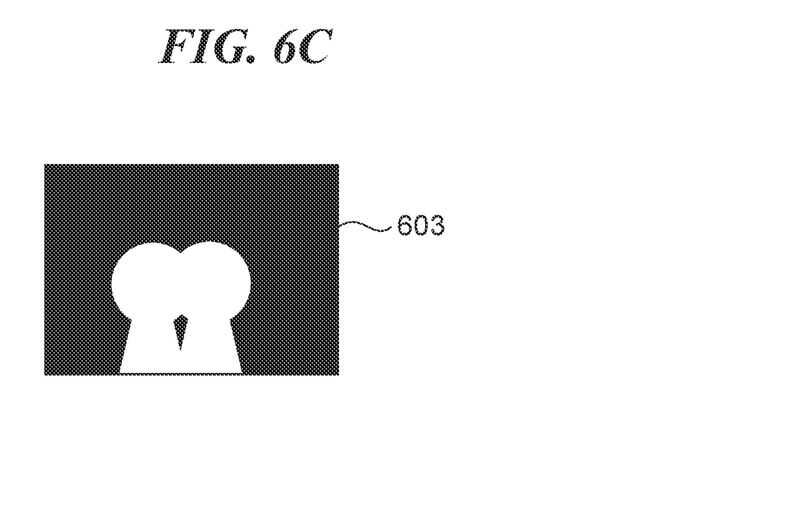

FIGS. 6A to 6E are diagrams showing images and detection results in moving body detection. A reference image 601 shown in FIG. 6A is the proper image (such as the image 501) acquired in the step S401. A corrected image 602 shown in FIG. 6B is the image for comparison, obtained by correcting the position of the image in which a moving body with respect to the reference image 601 exists. In the corrected image 602, the object which has slightly moved to the right with respect to the reference image 601 exists. A detection result 603 shown in FIG. 6C is a diagram showing a result of the moving body detection performed between the reference image 601 and the corrected image 602.

Figure 6D:
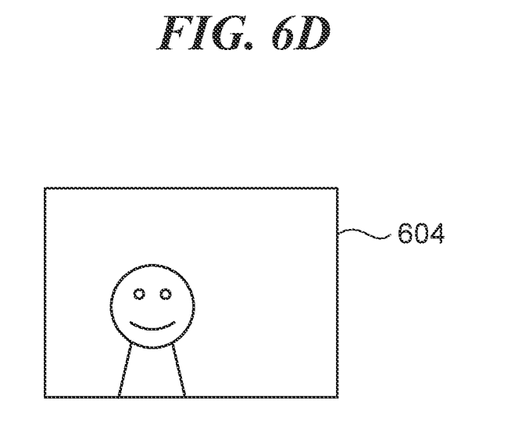
Figure 6E:
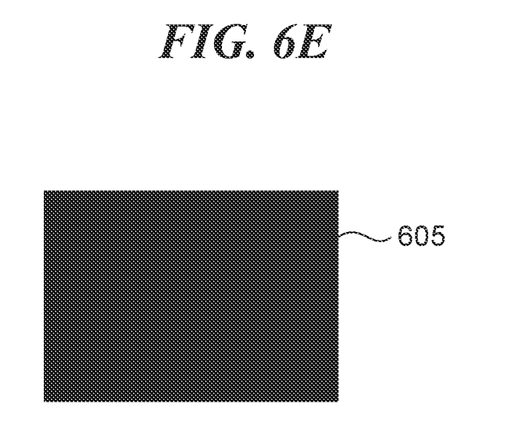

A corrected image 604 shown in FIG. 6D is an image for comparison, which is obtained by correcting the position of the image in which no moving body with respect to the reference image 601 exists. A detection result 605 shown in FIG. 6E is a diagram showing a result of the moving body detection performed between the reference image 601 and the corrected image 604.

The image processor 104 detects a moving body area from the reference image and the image for comparison. Although the method of detecting a moving body area is not particularly limited, there may be used, for example, the following method of taking a difference between two images. That is, the image processor 104 determines whether or not a moving body exists based on a difference between the image signals of the reference image and the image signals of the image for comparison. Using color signals and a luminance signal, the difference Diff is calculated by the following equation (2):

$$Diff = \sqrt{(Y_{base} - Y_{oth})^2 + (U_{base} - U_{oth})^2 + (V_{base} - V_{oth})^2} \quad (2)$$

In this equation, Y represents the luminance signal, and U and V each represent the color signal. Therefore, the difference Diff means a color difference. The detection results 603 and 605 are obtained by this method.

In a step S407, the image processor 104 as a determination unit determines whether or not there is a moving body having moved between the reference image and the image for comparison, based on results of the moving body detection executed in the step S406. For example, it is determined based on the detection result 603 that there is a moving body having moved between the reference image 601 and the corrected image 602. On the other hand, it is determined based on the detection result 605 that there is no moving body having moved between the reference image 601 and the corrected image 604. If it is determined that there is a moving body having moved between the reference image and the image for comparison, the image processor 104 proceeds to a step S408, whereas if it is determined that there is no moving body, the image processor 104 proceeds to a step S409.

Note that although whether or not there is a moving body can be determined based on a result of the moving body detection, a threshold value may be used for this determination. That is, the image processor 104 may determine that there is a moving body in a case where the difference Diff between the color signals of the reference image and the color signals of the image for comparison is larger than the threshold value.

In the step S408, the image processor 104 as a selection unit selects two images read with different gains by one exposure operation, as the images used for the HDR combination. The two images mentioned here are e.g. the images 501 and 502 acquired in the step S401, but may be the images 503 and 504 acquired in the step S402. That is, the image processor 104 selects the images 501 and 502, acquired with proper exposure, or the images 503 and 504, acquired with underexposure. Which images to select may be determined according to a combination ratio, as described hereafter.

Figure 7:
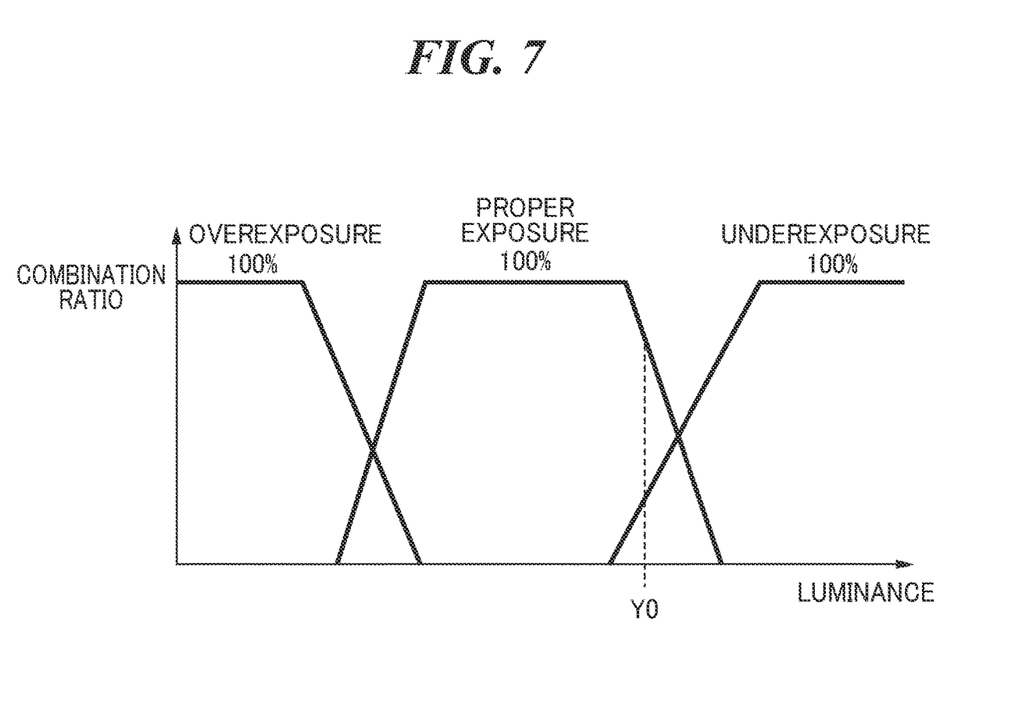
FIG. 7 is a diagram showing a combination ratio table.

FIG. 7 is a diagram showing a combination ratio table. The horizontal axis in FIG. 7 represents a reference luminance, and the vertical axis represents the combination ratio. In the present embodiment, there is employed a method of determining application ratios of areas to be combined, based on the luminance distribution on the reference image is employed. The image processor 104 sets the combination ratio of each image from the luminance value of the reference image, based on the combination ratio table. Let it be assumed, for example, that the image 501 is set as the reference image, and the luminance value of the reference image is Y0. At the luminance value Y0, the proper image is larger in combination ratio, and hence the image processor 104 selects the image 501 and the image 502. Note that any one of the images 501 to 504 may be set as the reference image.

As described above, in a case where it is determined that a moving body exists, according to the combination ratio determined based on the luminance level of the reference image, by referring to exposure amounts with which images are acquired, respectively, there are selected images to be used for the HDR combination. With this, the images which are larger in HDR-combination ratio are selected depending on a scene. Note that the luminance distribution acquisition method is not limited to acquisition from the reference image, but the luminance distribution may be acquired from a histogram acquired before photographing.

In the step S409, the image processor 104 as the selection unit selects the images captured with different exposure amounts, as the images to be used for the HDR combination. The image processor 104 selects at least one of the images 501 and 502, acquired with the proper exposure, and at least one of the images 503 and 504, acquired with underexposure. Note that the image 501 and the image 504 are equivalent in luminance level, and hence one of these images may be excluded from the selection. For example, the image processor 104 may select the images 501 and 502, acquired in the step S401, and the image 503 acquired in the step S402. Note that when excluding one of the images equivalent in luminance level, one which is suitable as an object to be combined, such as one which is less in noise, may be included in the images to be selected according to exposure and gain allocation at the time of readout operations.

Thus, the images to be used for image combination are selected out of a plurality of images output from the image capturing device 102, based on a result of the determination of whether or not a moving body exists.

In a step S410, the image processor 104 as a combining unit performs the HDR combination using the images selected in the step S408 or S409, followed by terminating the process in FIG. 4. As described above, the images selected for the HDR combination are switched to images from which unnatural drawing due to a moving body is not performed, whereby it is possible to prevent unnatural drawing from being caused due to a moving body.

Figure 8:
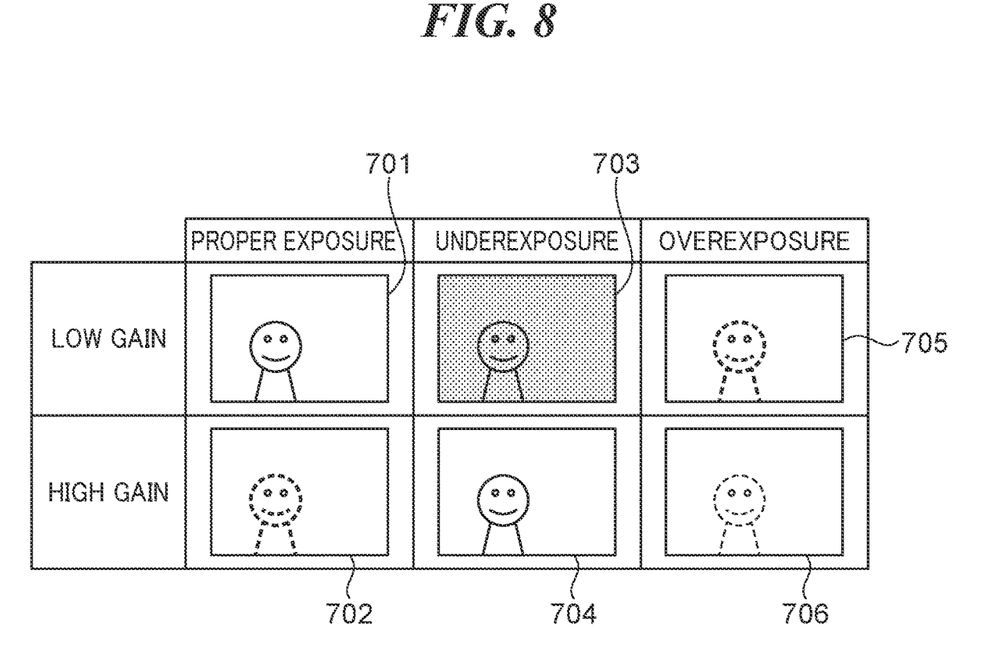
FIG. 8 is a diagram showing an example of a plurality of images amplified with different gains for each of exposure operations with three different exposure amounts.
Figure 9A:
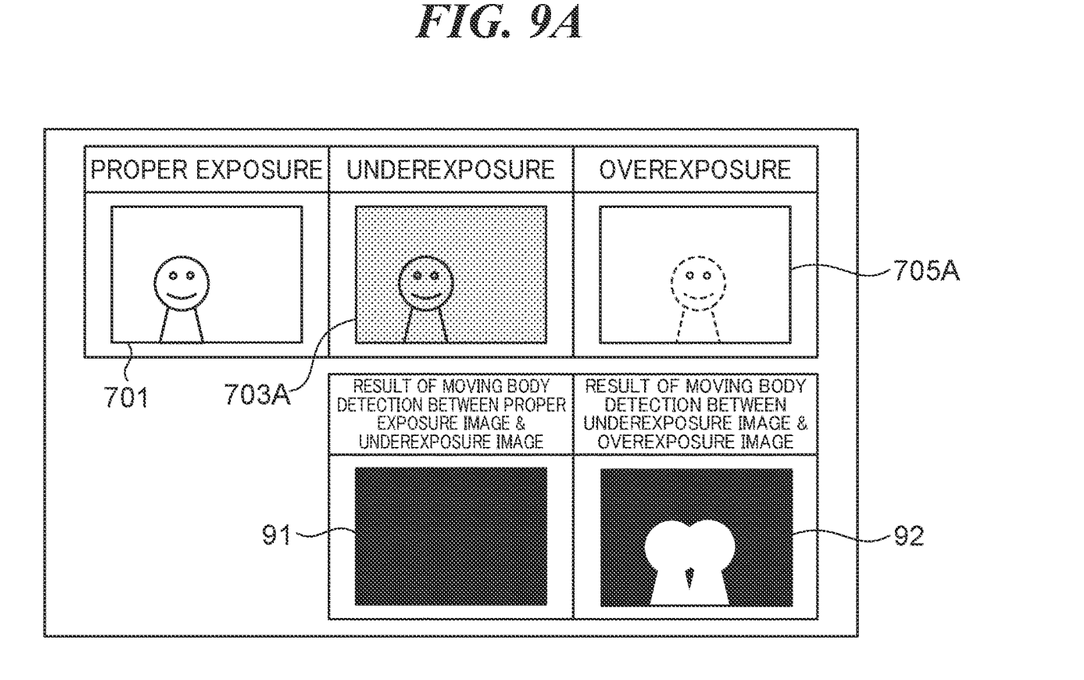
FIGS. 9A to 9C are diagrams each showing a result of moving body detection between images.
Figure 9B:
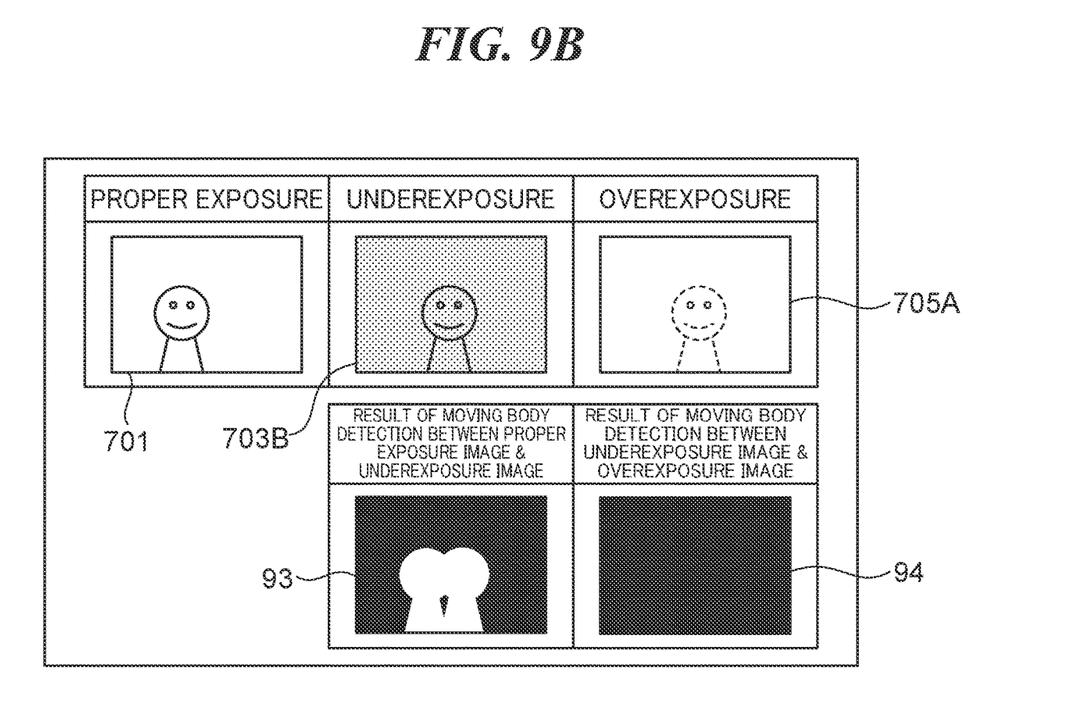
Figure 9C:
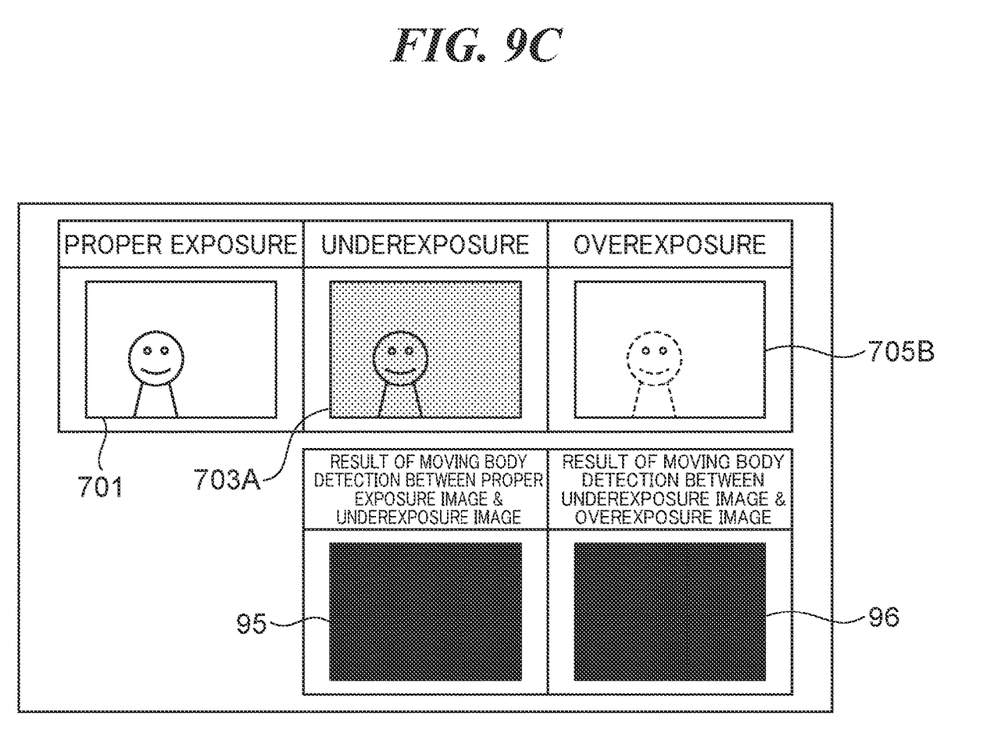

Next, let us consider a case where three or more types of exposure amounts are set, with reference to FIGS. 8 and 9.

FIG. 8 is a diagram showing an example of a plurality of images amplified with different gains for each of exposure operations with respective three different exposure amounts. FIG. 8 shows an example in which photographing is performed with the three types of exposure amounts, i.e. proper exposure (first exposure amount), underexposure (second exposure amount), and overexposure (third exposure amount), and two images are read out with the low gain (first gain) and the high gain (second gain) in each exposure operation.

An image 701 (first image) is a proper image photographed with the exposure amount of proper exposure and read with the low gain. An image 702 (second image) is an image photographed with the exposure amount of proper exposure and read with the high gain. An image 703 (third image) is an image photographed with underexposure and read with the low gain. An image 704 (fourth image) is an image photographed with underexposure and read with the high gain.

An image 705 (fifth image) is an image photographed with overexposure and read with the low gain. An image 706 (sixth image) is an image photographed with overexposure and read with the high gain. The image 701 and the image 704 are equivalent in luminance level. The image 702 and the image 705 are equivalent in luminance level.

In the two images read with the different gains, respectively, there is a possibility that noise is increased in an image read with the high gain, due to amplification by the amplifier. Therefore, in a scene where unnatural drawing due to a moving body is not caused, it is desirable not to select an image read with the high gain, but to select an overexposure image formed by an exposure amount increased by extending the exposure time.

To generate an image having a wide dynamic range by the HDR combination, there is conventionally used a method in which an overexposure image is used to express a blackout area in an image photographed with proper exposure and an underexposure image is used to express a whiteout area in the image. However, in the HDR combination using two images read with different gains, an area where gradation cannot be interpolated is generated. For example, in the HDR combination using the image 701 and the image 702, since an underexposure image is not included in the images to be combined, it is impossible to properly express the whiteout area. On the other hand, in the HDR combination using the image 703 and the image 704, since an overexposure image is not included in the images to be combined, it is impossible to properly express the blackout area. Therefore, it is desirable to select the images to be combined by collectively taking these points into consideration.

FIGS. 9A to 9C are diagrams each showing a result of moving body detection between images. A relationship between a moving body detection result and selection of images to be used for the HDR combination will be described with reference to FIGS. 9A to 9C. The description is given based on an example of a case where a plurality of images corresponding to the images 701 to 706, shown in FIG. 8 by way of example, are acquired.

Note that FIGS. 9A to 9C each show only images corresponding to the images 701, 703, and 705, read with the low gain, out of the images 701 to 706. Further, FIGS. 9A to 9C show results of moving body detection (91 to 96) between the proper exposure image (701) and the underexposure image (703A or 703B), and between the underexposure image and the overexposure image (705A or 705B). The detection results 91 to 96 are shown in the same form as the detection results 603 and 605, shown in FIGS. 6C and 6E.

The image 703A and the image 703B, which correspond to the image 703, are the same in the conditions of the exposure amount and the gain, but different in the position of the object. The image 705A and the image 705B, which correspond to the image 705, are the same in the conditions of the exposure amount and the gain, but different in the position of the object.

In the illustrated example in FIG. 9A, it is determined that there is no moving body having moved between the proper exposure image 701 and the underexposure image 703A (detection result 91), and it is determined that there is a moving body having moved between the underexposure image 703A and the overexposure image 705A (detection result 92).

Since it is determined that there is a moving body having moved between the image 703A and the image 705A, if the underexposure images (703A and 704) and the overexposure images (705A and 706) are selected for the HDR combination, unnatural drawing due to the moving body may be caused. On the other hand, since it is determined that there is no moving body having moved between images 701 and 703A, even if the proper exposure images (701 and 702) and the underexposure images (703A and 704) are selected for the HDR combination, unnatural drawing is not caused. Therefore, the image processor 104 selects the images 701, 702, and 703A for the HDR combination. Note that the image processor 104 may select the images 701, 702, 703A, and 704.

In the illustrated example in FIG. 9B, it is determined that there is a moving body having moved between the proper exposure image 701 and the underexposure image 703B (detection result 93), and it is determined that there is no moving body having moved between the underexposure image 703B and the overexposure image 705A (detection result 94).

Since it is determined that there is a moving body having moved between the image 701 and the image 703B, if the proper exposure images (701 and 702) and the underexposure images (703B and 704) are selected for the HDR combination, unnatural drawing due to the moving body may be caused. On the other hand, since it is determined that there is no moving body having moved between image 703B and 705A, even if the underexposure images (703B and 704) and the overexposure images (705A and 706) are selected for the HDR combination, unnatural drawing is not caused.

Therefore, the image processor 104 selects the images 703B, 704, and 705A for the HDR combination. If the image 706 is further added, range extension becomes unbalanced between the underexposure side and the overexposure side, and hence the image 706 is excluded from the selection. However, the image 706 may be added to the selection. Note that in the illustrated example in FIG. 9B, in a case where the underexposure is regarded as the first exposure amount, and the overexposure is regarded as the second exposure amount, the image 703B, the image 704, the image 705A, and the image 706 are the first image, the second image, the third image, and the fourth image, respectively.

In the illustrated example in FIG. 9C, it is determined that there is no moving body having moved between the proper exposure image 701 and the underexposure image 703A (detection result 95), and it is determined that there is no moving body having moved between the underexposure image 703A and the overexposure image 705B (detection result 96).

In this case, even if the proper exposure images (701 and 702), the underexposure images (703A and 704), and the overexposure images (705B and 706) are selected, unnatural drawing is not caused. However, it is desired to avoid, as much as possible, increase of noise, caused due to amplification by the amplifier. Therefore, the image processor 104 does not select the images 702, 704, and 706, but selects the images 701, 703A, and 705B. This reduces the noise. Note that all of the images 701 to 706 may be selected.

As described above, even in a case where a proper image, an underexposure image, and an overexposure image are acquired by differentiating the exposure, and are combined to generate a wide dynamic range image, it is also possible to properly select images to be used for combination, based on a result of the moving body detection.

According to the present embodiment, the images to be used for image combination are selected based on a result of determination of whether or not there is a moving body having moved between images acquired for each of the exposure operations with different exposure amounts. First, the first image amplified with the first gain and the second image amplified with the second gain are acquired by an exposure operation with the first exposure amount, and the third image amplified with the first gain and the fourth image amplified with the second gain are acquired by an exposure operation with the second exposure amount. Then, if it is determined that there is a moving body having moved between the first and third images, the first image and the second image, or the third image and the fourth image are selected. Therefore, strangeness caused due to the moving body is suppressed. On the other hand, if it is determined that there is no moving body having moved between the first and third images, at least one of the first image and the second image, and at least one of the third image and the fourth image are selected. Therefore, the wide dynamic range is realized. As a result, it is possible to ensure the wide dynamic range while suppressing strangeness caused due to a moving body.

Particularly, whether to select images acquired with the same exposure amount and different gains or to select images acquired with the different exposure amounts is automatically switched, and hence it is possible to provide a wide dynamic range image with less strangeness without making a user conscious of this switching.

Further, in a case where images are acquired with three or more exposure amounts, even if it is determined that there is a moving body, it is possible to select images such that the range extension is balanced between the underexposure side and the overexposure side (see FIG. 9B).

Further, even in a case where the images are acquired with three or more exposure amounts, if it is determined that there is no moving body, it is possible to select images such that noise is reduced (see FIG. 9C).

Note that the disclosure can also be applied to a mobile device incorporating an image capturing device, a network camera that is capable of capturing an image, and so forth. Note that the image capturing apparatus to which the disclosure is applied may be referred to as the image processing apparatus.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-173014, filed Oct. 22, 2021, which is hereby incorporated by reference herein in its entirety.

What is claimed is:

1. An image processing apparatus, comprising:
   at least one processor; and
   a memory coupled to the at least one processor, the memory having instructions that, when executed by the processor, perform the operations as:
   an acquisition unit configured to acquire a plurality of images amplified with different gains, respectively, for each of exposure operations with different exposure amounts;
   a determination unit configured to determine whether or not there is a moving body having moved between images acquired for each of exposure operations with different exposure amounts; and
   a selection unit configured to select images to be used for image combination out of the plurality of acquired images, based on a result of determination performed by the determination unit,
   wherein the acquisition unit acquires a first image amplified with a first gain and a second image amplified with a second gain by an exposure operation with a first exposure amount, and acquires a third image amplified with the first gain and a fourth image amplified with the second gain by an exposure operation with a second exposure amount which is different from the first exposure amount, and
   wherein in a case where it is determined that the moving body having moved between the first image and the third image exists, the selection unit selects the first image and the second image, or selects the third image and the fourth image, whereas in a case where it is determined that the moving body does not exist between the first image and the third image, the selection unit selects at least one of the first image and the second image, and at least one of the third image and the fourth image.

2. The image processing apparatus according to claim 1, wherein in a case where the first exposure amount is larger than the second exposure amount, the second gain is larger than the first gain, and it is determined that the moving body having moved between the first image and the third image does not exist, the selection unit selects the first image, the second image, and the third image.

3. The image processing apparatus according to claim 1, wherein in a case where the second exposure amount is larger than the first exposure amount, the second gain is larger than the first gain, and it is determined that the moving body having moved between the first image and the third image does not exist, the selection unit selects the first image, the second image, and the third image.

4. The image processing apparatus according to claim 1, wherein the acquisition unit further acquires a fifth image amplified with the first gain and a sixth image amplified with the second gain by an exposure operation with a third exposure amount different from the first and second exposure amounts, and
   wherein in a case where the first exposure amount is larger than the second exposure amount, the third exposure amount is larger than the first exposure amount, the second gain is larger than the first gain, it is determined that the moving body having moved between the first image and the second image does not exist, and it is determined that the moving body having moved between the second image and the third image does not exist, the selection unit selects the first image, the third image, and the fifth image.

5. The image processing apparatus according to claim 1, wherein in a case where it is determined that the moving body having moved between the first image and the third image exists, the selection unit determines whether to select the first image and the second image or to select the third image and the fourth image, according to a combination ratio determined based on a luminance level of one image out of the first, second, third, and fourth images.

6. The image processing apparatus according to claim 1, wherein the determination unit determines, based on a difference between image signals of a reference image and image signals of an image for comparison, out of the plurality of acquired images, whether or not the moving body having moved between the reference image and the image for comparison exists.

7. The image processing apparatus according to claim 6, wherein in a case where a difference between color signals of the reference image and color signals of the image for comparison exceeds a threshold value, the determination unit determines that the moving body having moved between the reference image and the image for comparison exists.

8. The image processing apparatus according to claim 1, wherein the acquisition unit acquires the plurality of images from a sensor that outputs images amplified with different gains, respectively, by one exposure operation.

9. The image processing apparatus according to claim 1, wherein the memory having instructions that, when executed by the processor, perform the operations further as:
   a combination unit configured to combine images selected by the selection unit.

10. An image capturing apparatus, comprising:
an image processing apparatus according to claim 1; and
a sensor that outputs images amplified with different gains, respectively, by one exposure operation.

11. A method of controlling an image processing apparatus, comprising:
acquiring a plurality of images amplified with different gains, respectively, for each of exposure operations with different exposure amounts;
determining whether or not there is a moving body having moved between images acquired for each of exposure operations with different exposure amounts; and
selecting images to be used for image combination out of the plurality of acquired images, based on a result of the determination,
wherein acquiring the plurality of images acquires a first image amplified with a first gain and a second image amplified with a second gain by an exposure operation with a first exposure amount, and acquires a third image amplified with the first gain and a fourth image amplified with the second gain by an exposure operation with a second exposure amount which is different from the first exposure amount, and
wherein in a case where it is determined that the moving body having moved between the first image and the third image exists, selecting images selects the first image and the second image, or selects the third image and the fourth image, whereas in a case where it is determined that the moving body does not exist between the first image and the third image, selecting images selects at least one of the first image and the second image, and at least one of the third image and the fourth image.

* * * * *